(12) United States Patent
Baldwin et al.

(10) Patent No.: US 9,129,420 B2
(45) Date of Patent: Sep. 8, 2015

(54) DETECTION OF PROTECTED SUBJECT MATTER IN THREE DIMENSIONAL PRINT MEDIA

(71) Applicant: Mercury 3D, LLC, Los Angeles, CA (US)

(72) Inventors: Christopher Buzz Baldwin, Attleboro, MA (US); Timothy Alan Padilla, Moorpark, CA (US); Jeffrey William Stevens, Los Angeles, CA (US)

(73) Assignee: 3D Printlife LLC, Los Angeles, CA (US)

( * ) Notice: Subject to any disclaimer, the term of this patent is extended or adjusted under 35 U.S.C. 154(b) by 218 days.

(21) Appl. No.: 13/788,124

(22) Filed: Mar. 7, 2013

(65) Prior Publication Data

US 2013/0235037 A1    Sep. 12, 2013

Related U.S. Application Data

(60) Provisional application No. 61/607,658, filed on Mar. 7, 2012.

(51) Int. Cl.
*G06T 17/00* (2006.01)
*G06F 21/00* (2013.01)
*G06F 21/60* (2013.01)

(52) U.S. Cl.
CPC ............... *G06T 17/00* (2013.01); *G06F 21/00* (2013.01); *G06F 21/608* (2013.01)

(58) Field of Classification Search
CPC ...................................................... G06T 17/00
USPC .................................. 345/418, 419, 420, 427
See application file for complete search history.

(56) References Cited

U.S. PATENT DOCUMENTS

| 7,925,044 | B2 | 4/2011 | Metois et al. |
| 8,023,695 | B2 | 9/2011 | Rhoads |
| 8,107,739 | B2 | 1/2012 | Seeber |
| 8,121,852 | B2 | 2/2012 | Frank et al. |
| 2007/0011149 | A1* | 1/2007 | Walker .............................. 707/4 |
| 2007/0055401 | A1* | 3/2007 | Van Bael et al. ................ 700/98 |
| 2008/0059426 | A1* | 3/2008 | Brock et al. ....................... 707/3 |
| 2009/0125510 | A1* | 5/2009 | Graham et al. ................... 707/5 |
| 2011/0276449 | A1 | 11/2011 | Funderburk et al. |
| 2011/0313291 | A1* | 12/2011 | Chono .......................... 600/440 |
| 2012/0002880 | A1 | 1/2012 | Lipson et al. |

(Continued)

OTHER PUBLICATIONS

D.-Y. Chen, M. Ouhyoung, X.-P. Tian, and Y.-T. Shen. On visual similarity based 3D model retrieval. Computer Graphics Forum, pp. 223-232, 2003.*

(Continued)

*Primary Examiner* — Kee M Tung
*Assistant Examiner* — Grace Q Li
(74) *Attorney, Agent, or Firm* — Fish & Tsang LLP (57) ABSTRACT

A contemplated system analyzes files used to create 3D objects by first virtually constructing the 3D object, and then by examining the virtual construct in a variety of different ways to determine if the 3D object has protected content. The system could examine the virtualized object from a variety of different angles, read characters embossed or imprinted upon the 3D object, and could even play virtualized records and other virtualized video/audio tools to determine if the 3D object has protected content. If the system rules that the 3D object has a high probability of having protected content, an alert is sent to an appropriate authority.

20 Claims, 4 Drawing Sheets

(56) References Cited

U.S. PATENT DOCUMENTS

| | | |
|---|---|---|
| 2012/0011105 A1 | 1/2012 | Brock et al. |
| 2012/0086720 A1* | 4/2012 | Burley et al. ................. 345/582 |
| 2012/0189178 A1* | 7/2012 | Seong ............................ 382/128 |
| 2013/0050765 A1* | 2/2013 | Zhan et al. ................... 358/3.01 |
| 2013/0129231 A1* | 5/2013 | Dale et al. ..................... 382/224 |

OTHER PUBLICATIONS

T. Funkhouser, P. Min, M. Kazhdan, J. Chen, A. Halderman, D. Dobkin, and D. Jacobs. A search engine for 3D models. Transactions on Graphics, 22(1):83-105, 2003.*

Lou R, Mikchevitch A. "Direct merging of triangle meshes preserving simulation semantics for fast modification of numerical models", Tools and Methods of Competitive Engineering, 2008, pp. 119-131.*

* cited by examiner

DETECTION OF PROTECTED SUBJECT MATTER IN THREE DIMENSIONAL PRINT MEDIA

This application claims priority to provisional application No. 61/607,658, filed Mar. 7, 2013, which is hereby incorporated by reference in its entirety.

FIELD OF THE INVENTION

The field of the invention is the detection of protected three-dimensional media.

BACKGROUND

The background description includes information that may be useful in understanding the present invention. It is not an admission that any of the information provided herein is prior art or relevant to the presently claimed invention, or that any publication specifically or implicitly referenced is prior art.

All publications herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

It has become easier and more pervasive for unauthorized users to illegally download and share files containing material that is subject to intellectual property protection, such as music and video files subject to copyright protection and packaging art and advertisements subject to trademark protection. Since much of the value of these protected works lie in the content owner's ability to sell and license these works to only authorized users, detection of unlicensed files containing such protected materials is essential to effectively protecting a corporation's intellectual property.

U.S. Pat. No. 7,925,044 to Metois et al., US2012/0002880 to Lipson and U.S. Pat. No. 8,107,739 to Seeber each teach computer systems that analyze two-dimensional images in order to determine whether those two-dimensional images violate intellectual property rights, such as copyright and trademark infringements. Metois, Lipson, and Seeber utilize databases that store known protected image templates and candidate fingerprints and compare those fingerprints to the two dimensional images in order to determine the likelihood that a suspect image contains protected subject matter. However, Metois, Lipson, and Seeber only teach an analysis of pre-constructed images and do not analyze metadata statistics that track the actual creation or use of the infringing subject matter.

US2011/0276449 to Funderburk et al. and US2012/0011105 to Brock also teach systems and methods of reviewing electronic documents to determine whether those electronic documents infringe a party's intellectual property rights, and also analyze metadata track down specific infringement actions or users that violate a content owner's usage rules. However, none of the cited art teach any systems or methods to analyze anything but a two-dimensional image.

U.S. Pat. No. 8,023,695 to Rhodes teaches a system that analyzes electronic video and audio files and pattern-matches these files against known, protected videos and audio segments in order to determine if the given video or audio file violates a party's intellectual property. However, all of the cited art only analyzes two-dimensional images and audio or video files. Infringers infringe the intellectual property rights of many products that are neither two-dimensional images nor audio/video files.

None of the above references teach a system or method to analyze a three-dimensional object to determine whether that object violates protected subject matter. Thus, there is still a need for systems and methods of analyzing three-dimensional objects to determine whether that object contains protected subject matter.

SUMMARY OF THE INVENTION

The following description includes information that may be useful in understanding the present invention. It is not an admission that any of the information provided herein is prior art or relevant to the presently claimed invention, or that any publication specifically or implicitly referenced is prior art.

In some embodiments, the numbers expressing quantities of ingredients, properties such as concentration, reaction conditions, and so forth, used to describe and claim certain embodiments of the invention are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

Unless the context dictates the contrary, all ranges set forth herein should be interpreted as being inclusive of their endpoints, and open-ended ranges should be interpreted to include commercially practical values. Similarly, all lists of values should be considered as inclusive of intermediate values unless the context indicates the contrary.

The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims It should be noted that any language directed to a computer should be read to include any suitable combination of computing devices, including servers, interfaces, systems, databases, agents, peers, engines, controllers, or other types of computing devices operating individually or collectively. One should appreciate the computing devices comprise a processor configured to execute software instructions stored on a tangible, non-transitory computer readable storage medium (e.g., hard drive, solid state drive, RAM, flash, ROM, etc.). The software instructions preferably configure the computing device to provide the roles, responsibilities, or other functionality as discussed below with respect to the disclosed apparatus. In especially preferred embodiments, the various servers, systems, databases, or interfaces exchange data using standardized protocols or algorithms, possibly based on HTTP, HTTPS, AES, public-private key exchanges, web service APIs, known financial transaction protocols, or other electronic information exchanging methods. Data exchanges preferably are conducted over a packet-switched network, the Internet, LAN, WAN, VPN, or other type of packet switched network.

The inventive subject matter provides apparatus, systems and methods in which a file containing instructions to create a three-dimensional ("3D") object could be analyzed using a plurality of different virtualized representations of the 3D object in order to determine if the 3D object contains any features that violate known protected subject matter. As used herein, "protected subject matter" is any intellectual property that could be protected and is generally licensed or sold to other parties as part of a product or service, such as copyrights, trademarks, and patents. Contemplated protected subject matter could be in the form of an image file, a video file, an audio file, a text file, and a set of limitations.

The computer system generally has a database containing protected subject matter in various forms that could be pattern-matched against one or more representations of a virtualized 3D object to determine whether a portion of a representation contains protected subject matter. For example, where the protected subject matter has a visually unique component, such as a copyrighted picture, copyrighted drawing, or a trademarked logo, the database could contain one or more images of the visually unique component. Where the protected subject matter is a trademarked word mark or a copyrighted text, the database could contain alphanumeric text containing the trademarked or copyrighted text. Where the protected subject matter is has an audio or video component, the database could contain a digital audio file or a digital video file, respectively, which depicts that audio or video component.

In one embodiment, a system generally has a processor that executes computer instructions to implement the disclosed methodology. The system generally starts by receiving and saving one or more electronic files that could be used to generate a three dimensional object onto a memory in a computer system, such as CAD, STL, VRML, OBJ, 3DS, MAX, and PRJ files. An exemplary embodiment could be distributed on a computer system having access to a file database containing a plurality of files for 3D objects, such as an online website that sells or otherwise distributes 3D files to customers for printing. Contemplated systems that offer such files are disclosed in co-pending U.S. application Ser. No. 13/783747, which is herein incorporated by reference. The computer system could analyze the file to create virtualized representation of the 3D object and analyze that representation from one or more viewing angles in order to determine whether the surface of 3D object contains any protected subject matter. For example, where the file is a 3D print job file, the computer system could "virtually print" the 3D object(s) within a virtualized Euclidian space using voxels to create a virtualized 3D object. The system could then process such files to create a virtualized 3D object within its transient or non-transient memory. For example, where the file contains instructions to print a 3D object, the system could be configured such that the system "virtually prints" the 3D object as a plurality of voxels within a Euclidean space.

Preferably, the computer system then creates virtualized two-dimensional ("2D") representations of the 3D object from at least 6 different viewing angles so as to view the object from its top, bottom, left, right, front, and back sides, however more or less viewing angles are contemplated. In other embodiments, the computer system could "unwrap" or "unfold" the top layer of the virtualized representation to create a virtualized 2D representation of a "wrapping paper" that would wrap around the 3D object for ease of viewing where the 3D object has projections that block a surface from view, or where the surface of the 3D object is curved. Exemplary unwrapping techniques are disclosed in EP0786072 to Moore, EP1042718 to Chiang, MS2011009232 to Murray, and U.S. Pat. No. 7,970,193 to Rouet, each of which are herein incorporated by reference. The system could also be configured to create a virtualized 2D representation by taking various flat surfaces of the object and merging them along shared edges, much in the way a 2D unwrapped cube is created by merging each flat surface against another flat surface that shares the same edge. In still other embodiments, the system could create a virtualized 2D representation of the 3D object by saving an "X-ray" view of the 3D object by rendering a portion of the 3D object transparent.

Once one or more 2D representations of the 3D object have been created, the system could also scan each 2D representation to determine if any representation has alphanumeric characters to create one or more text files that contain alphanumeric text detected upon the 3D object. Where the 3D object is tool that is capable of producing audio or visual effects when combined with other tools, such as a CD, DVD, diskette, or projector film, the system is preferably configured to "virtually play" the 3D object to create a digital audio file and/or a digital video file that could be analyzed to determine if the created 3D object could be placed within a "player" to infringe protected content.

Where the protected content is a visually unique component, such as a copyrighted text, a copyrighted picture, a trademarked logo, or a trademarked word mark, the system is generally configured to be able to pattern-match that visually unique component against virtualized views of the 3D object to determine whether a two-dimensional representation of the 3D object contains the visually unique component. Preferably the system is configured to determine whether a two-dimensional representation of the virtualized 3D object could contain the visually unique component at an angle, and is configured to then rotate the view of the virtualized 3D object until the suspected picture or drawing is displayed in a plan view. In other words, such a system could create an optimized two-dimensional representation of the virtualized three-dimensional object from a viewing angle that maximizes the similarity between a portion of the two-dimensional representation and the protected subject matter by showing the virtualized three-dimensional object at an angle that shows the protected subject matter from its most prominent angle.

Where the protected content is alphanumeric text, such as a trademarked word mark or a copyrighted text, the system is preferably configured to pattern-match the protected content against alphanumeric text detected either upon a surface of the 3D object, or formed by the 3D object itself. For example, the 3D object could form a plurality of alphanumeric characters as a series of stencils or blocks given in a certain order. Where the protected subject matter has an audio component or a video component, the system is preferably configured pattern-match the digitized audio component against protected subject matter in a similar manner to techniques taught in U.S. Pat. No. 8,023,695 to Rhodes. Likewise, where the protected subject matter has a video component the system is preferably configured to pattern-match the digitized video component against protected subject matter in a similar manner to techniques taught in U.S. Pat. No. 8,023,695 to Rhodes.

In either case, when the system detects that the virtualized representation of the 3D object either contains protected subject matter, the system generally sends an alert that notifies a party or another module that the file is capable of being used to create 3D object that contains protected subject matter. Such an alert is preferably sent with additional metadata related to the file and/or the protected subject matter, for example, an identifier of the file, an identifier of the file location, a time-stamp of when the file was accessed, an identifier of the protected subject matter, a two-dimensional representation of the three-dimensional object, and an optimized two-dimensional representation of the three-dimensional object to show an optimal view of the protected subject matter. The alert could be sent to a variety of entities, such as the owner of the location where the file is located, an online service provider (OSP) that hosts the location where the file is located, the owner of the protected subject matter, or an entity that enforces protection of such subject matter. Contemplated alerts could be sent via, for example, text message, email, or letter.

Various objects, features, aspects and advantages of the inventive subject matter will become more apparent from the following detailed description of preferred embodiments, along with the accompanying drawing figures in which like numerals represent like components.

One should appreciate that the disclosed techniques provide many advantageous technical effects including the ability to determine if an entity that sells files for printing 3D objects is violating intellectual property rights, or to determine which files containing representations of 3D objects have intellectual property rights associated with them.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

DETAILED DESCRIPTION

In order to fully analyze a three dimensional object, that three dimensional object will generally be virtualized upon a computer system. While some three dimensional objects may be saved in a computer format as a series of images viewable from a plurality of different angles, many three dimensional objects are saved as a series of instructions for a computer construct such a three-dimensional object, for example a CAD (Computer Aided Design) file, an STL (STereoLithography) file, VRML (Virtual Reality Markup Language) file, OBJ (Object) file, 3DS (Three-Dimensional Studio) file, MAX (Three-Dimensional Studio Max) file, and a PRJ (Projection) file. Such a series of instructions may contain a plurality of vertices defining a plurality of planes which, when colorized, may form the surface area of the virtualized three dimensional object, or a series of instructions may contain a plurality of "voxel" building blocks which, when all put together, form a virtualized three dimensional object.

Figure 1:
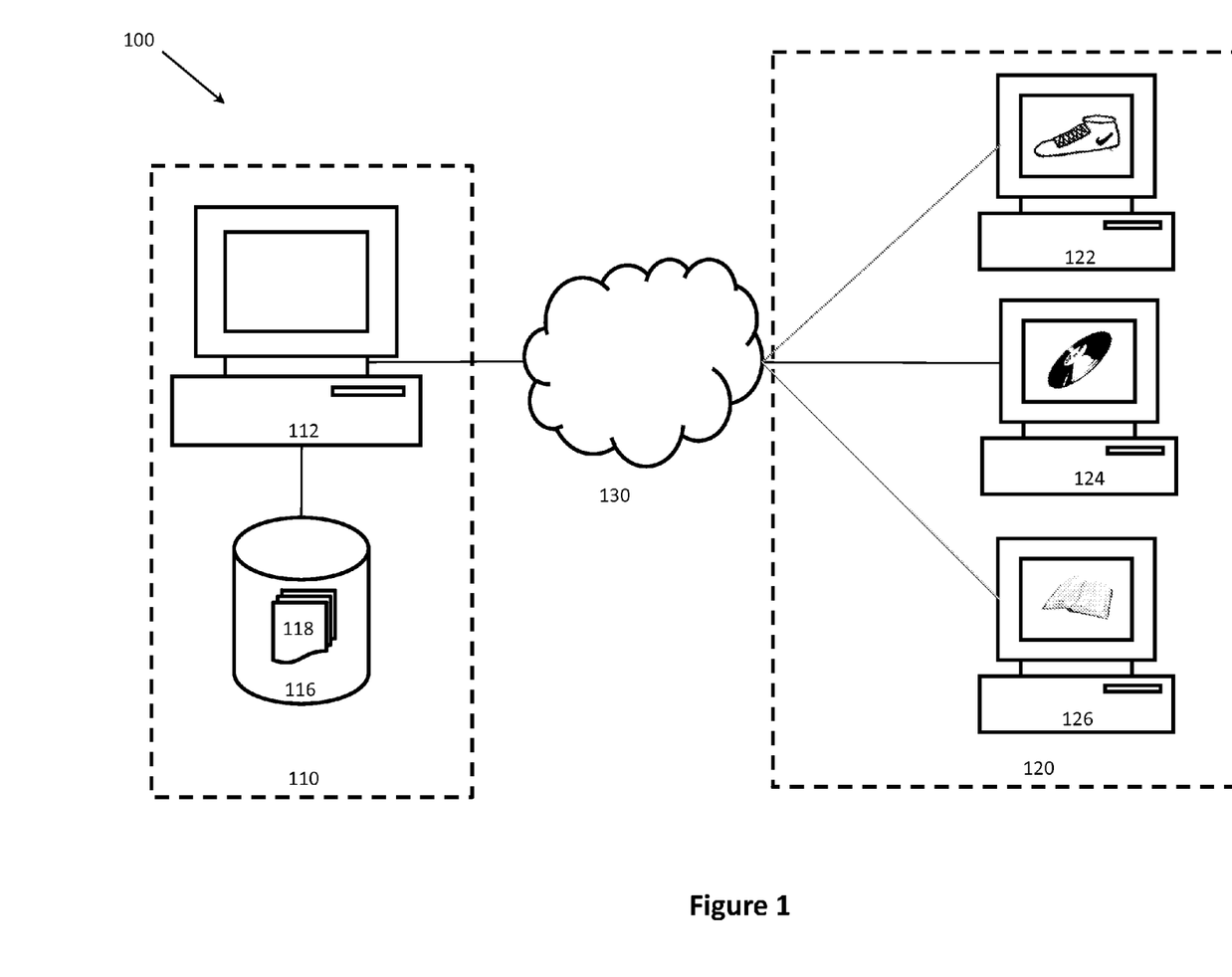
FIG. 1 shows a schematic of a system that virtually creates 3D objects within a computer system.

FIG. 1 shows an exemplary system 100 having a file source 110 and analysis engine 120 functionally coupled with one another through network 130. File source 110 is shown euphemistically as a computer system 112 coupled to a non-transient memory database storage 116 holding files 118, however file source 110 could be any suitable electronic medium that acts as a source for files that could be used to create virtualized 3D object representations, such as a network attached storage, a database of instruction sets, and a website selling 3D printed object instructions.

Network 130 is generally utilized by the system to functionally couple computer system 112 with computer systems 122, 124, and 126. Contemplated networks include intranets, internets, the Internet, and other known networking systems used to functionally couple computer systems. While analysis engine 120 is shown euphemistically as a plurality of computer systems 122, 124, and 126, contemplated analysis engines could comprise only a single computer system, a single computer system networked with a plurality of storage systems, or a plurality of computer systems coupled with a plurality of storage systems.

Each of computer system 122, 124, and 126 is configured to receive one or more files stored on database 116 which could be used by a computer system to virtually construct a 3D object. In some embodiments, analysis engine 120 serially scans files from database 116 and distributes the files evenly to several computer systems to optimize the time it takes to fully analyze all files within database 116. In other embodiments, analysis engine copies all 3D files within file source 110 to a local database to scan at its leisure. Computer system 122 is shown constructing a virtual 3D shoe, while computer system 124 is shown constructing a virtual 3D record, and computer system 126 is shown constructing a virtual 3D book. Other 3D objects are contemplated, such as jewelry, clothing, tools, spare parts, clothing, DVDs, CDs, toys, and supplies.

Figure 2:
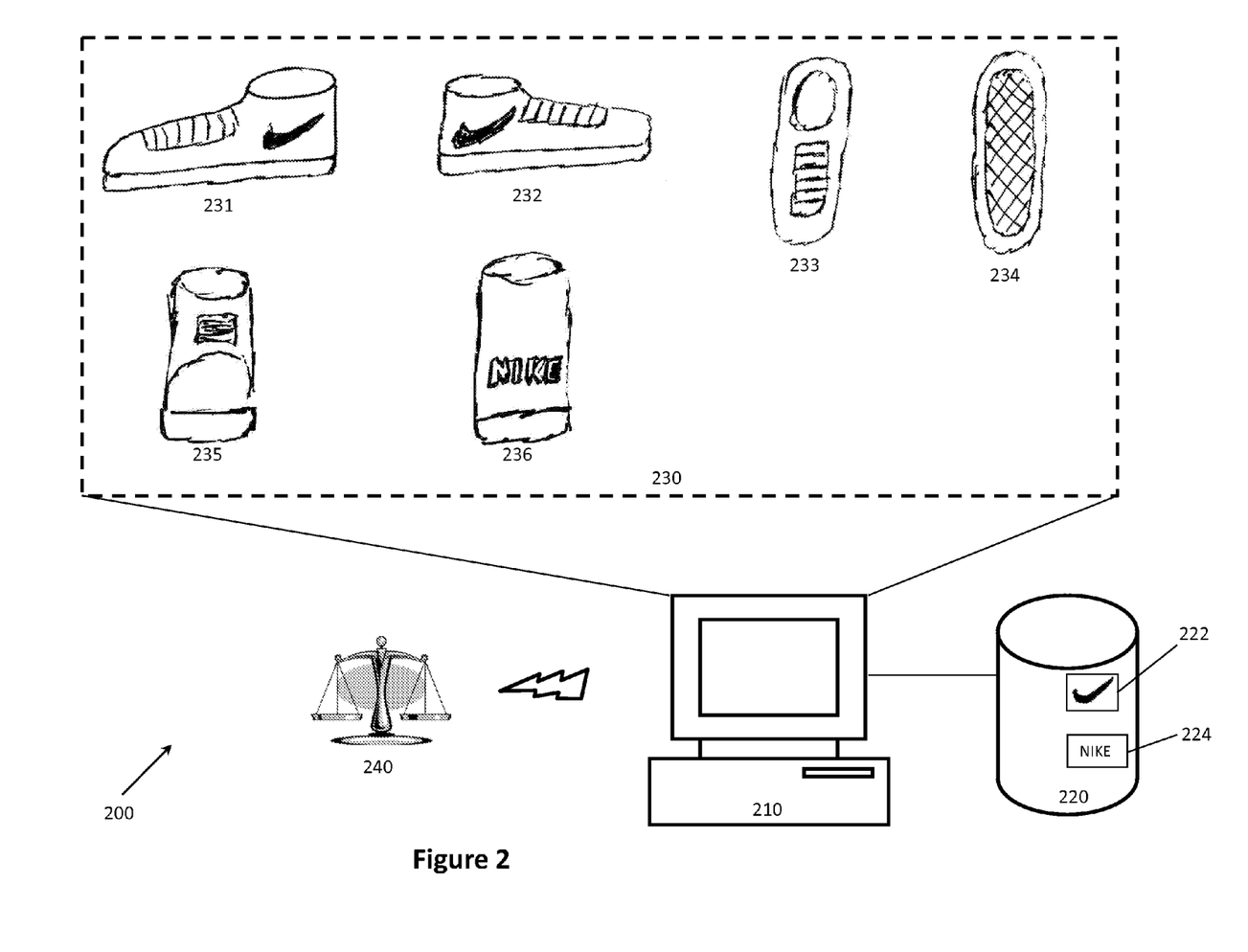
FIG. 2 shows a schematic of a system that analyzes a plurality of virtualized two-dimensional representations from a virtualized three-dimensional representation.

Since three-dimensional objects have a plurality of different viewing angles, it is usually difficult to ascertain whether the three dimensional object contains protected subject matter unless the system analyzes the object from a plurality of different viewing angles. As shown in FIG. 2, a system 200 could be configured to construct a plurality of two-dimensional representations of a 3D object within virtualized space 230. Here, each of two-dimensional representation 231, 232, 233, 234, 235, and 236 represents a different view of a 3D shoe shown from a plurality of different angles. At minimum, the system should analyze the object from at least six different viewing angles, but at least 32 viewing angles are preferred to obtain maximal coverage and to prevent the system from "missing" protected subject matter from an angle that is difficult to review. Where the object has a recess or a cavity, the system preferably increases the number of viewing angles in order to fully analyze an entire surface area of the three dimensional object, both the inner surface area within the cavity and upon the outer surface of the object.

Computer system 210 analyzes each of the two-dimensional representations and preferably scans for alphanumeric text to detect the letters "NIKE" in two-dimensional representation 236. Then computer system 210 pattern-matches each of the virtualized two-dimensional representations within virtualized space 230 against its protected subject matter 222 and 224 within database 220, and concludes that two-dimensional representations 231, 232, and 236 each contain protected subject matter for the company Nike®. Two-dimensional representations 231 and 232 both contain logos for a registered trademark, and two-dimensional representation 236 contains an instance of a registered word mark.

Analyzing an image of a three dimensional object to determine if it has protected subject matter can be done in a variety of different ways. Where the protected subject matter is a copyright image a trademark logo, or a design patent, the system could simply perform an image comparison test to determine whether the viewing angle of the three dimensional object contains a substantially similar image to the image or logo. The system could detect exact matches, but preferably could detect "similar" matches, such as images that are of a different size, different shade of color, or are skewed in some manner. In a preferred embodiment, where the system detects a "similar" match that is not exact, the system will lock onto the three dimensional coordinates of the substantially similar image and analyze a plurality of different views around the locked-on coordinates to determine if there is a viewing angle that has a greater degree of similarity or identically with the copyrighted image or trademarked logo. Generally, a system won't find an exact match, but will return a percentage likelihood of a similarity between a representation of the 3D object and the protected subject matter. An exemplary embodiment only returns alerts when the percentage likelihood of a similarity is greater than a threshold value, for example, at least 80% similarity, 85% similarity, 90% similarity, or at least 95% similarity. Where the percentage is higher than a first threshold, but lower than a second threshold (such as, for example higher than 80% but lower than 95%), the system could be configured to flag the item for secondary review by a more discerning system, or to a human user who can use other, non-automated verification means to determine if the three dimensional object actually contains the protected subject matter in question.

The system is generally configured to send an alert to a remote facility 240 which could then judge to see if a likely infringement has occurred, and notify the appropriate authorities. The system also preferably sends metadata relating to the 3D object file and/or the protected subject matter with the alert to determine if the file is licensed, and/or if the file is being used properly within the licensing parameters. For example, a system could detect that a file is licensed to be used 6 times, but detects metadata that the file has been sold 10 times, and could then notify the appropriate authorities that the distributor of the file has violated license terms. Contemplated authorities include an online service provider OSP) that allows a system to host the file, an individual or company that owns the protected subject matter, and the individual or company that made the file available.

In other embodiments the protected subject matter could be a patent that contains a plurality of limitations for various objects. In order to properly analyze a three dimensional object to determine if the three dimensional object contains patented subject matter, the system must first have a repository of images, where every limitation is represented by at least one image. For example, where an independent claim of an issued patent could contain three physical elements, the system should have at least one image of each physical element, and then should analyze and pattern match the three dimensional object to determine if the three dimensional object has viewing angles that contain items that are substantially similar to each of the three physical elements. A single viewing angle may contain all three objects, or three different viewing angles may be found, where each viewing angle matches a different object. If all three objects are viewable on or about the three dimensional object, the system could flag the object as being one that potentially infringes a patent.

Figure 3:
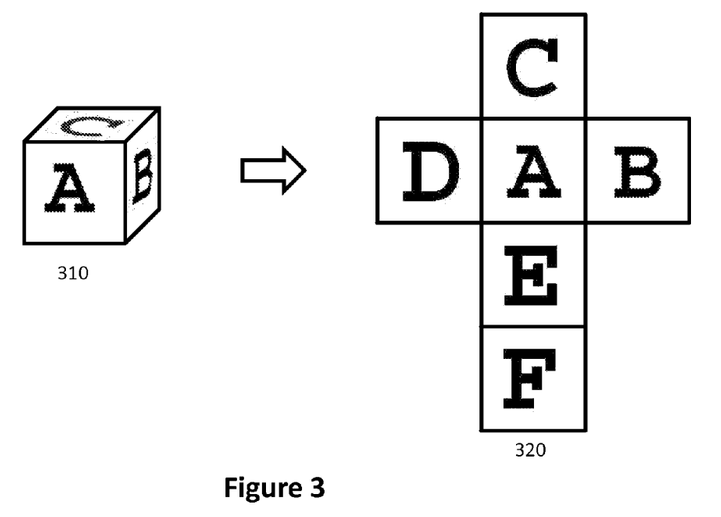
FIG. 3 shows an example of a system that produces a virtualized two-dimensional representation by unwrapping a surface layer of a virtualized three-dimensional representation.

In FIG. 3, an exemplary system produces a two-dimensional representation 320 of the 3D object 310 by virtually "unwrapping" a surface of 3D object 310 to analyze its surface in a different manner. The surface A on 3D object 310 is merged with the surfaces B, C, and D to show a contiguous surface between each of the objects. Where a surface of the 3D object is curved, the system could be configured to stretch or shrink the two-dimensional representation to show a particular view of the 3D object from such an angle. A variety of "unwrapped" two-dimensional representations could be utilized in order to analyze the 3D object in a variety of different ways. For example, a two-dimensional representation could have been constructed that merges surface F with surfaces E, B, D, and C as well. Or a plurality of two-dimensional representations could be created that represent only the surface of the 3D object.

Figure 4:
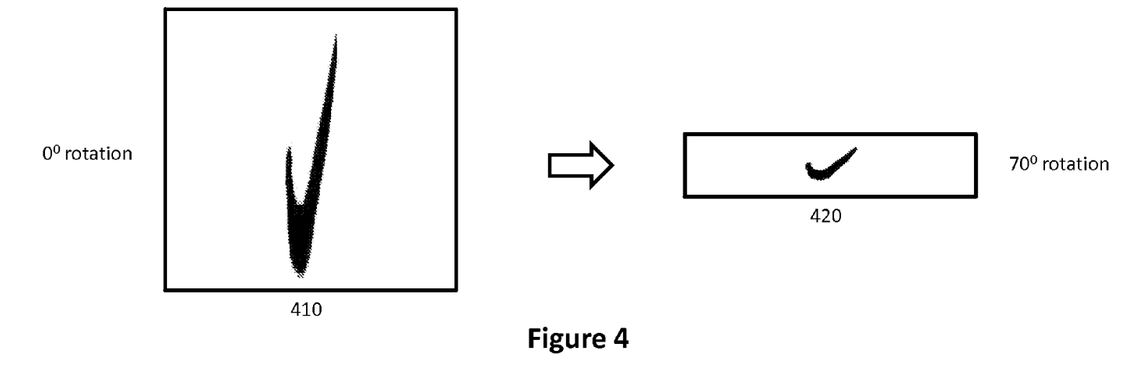
FIG. 4 shows an example of a system creating an optimized virtual two-dimensional representation.

In FIG. 4, an exemplary system that finds a similarity between a two-dimensional representation 410 of the 3D object creates an optimal two-dimensional representation 420 by rotating the object to maximize the similarity between the two-dimensional representation and the protected subject matter. Here, the system detects that the two-dimensional representation 410 likely contains a representation of the Nike® swoosh, but before sending an alert to a designated authority, the system first creates an optimized two-dimensional representation 420 by rotating the object from the 0° rotation to a 70° rotation to show that, when the 3D object is rotated to a 70° rotation, the protected subject matter is easily seen. Such a system could be configured to rotate the 3D object along each of the x, y, and z axis in order to optimize the two-dimensional representation. Once an optimized two-dimensional representation is created, the system could send the optimized two-dimensional representation along with the alert to show the appropriate authorities which views of the 3D object contain protected subject matter.

Figure 5:
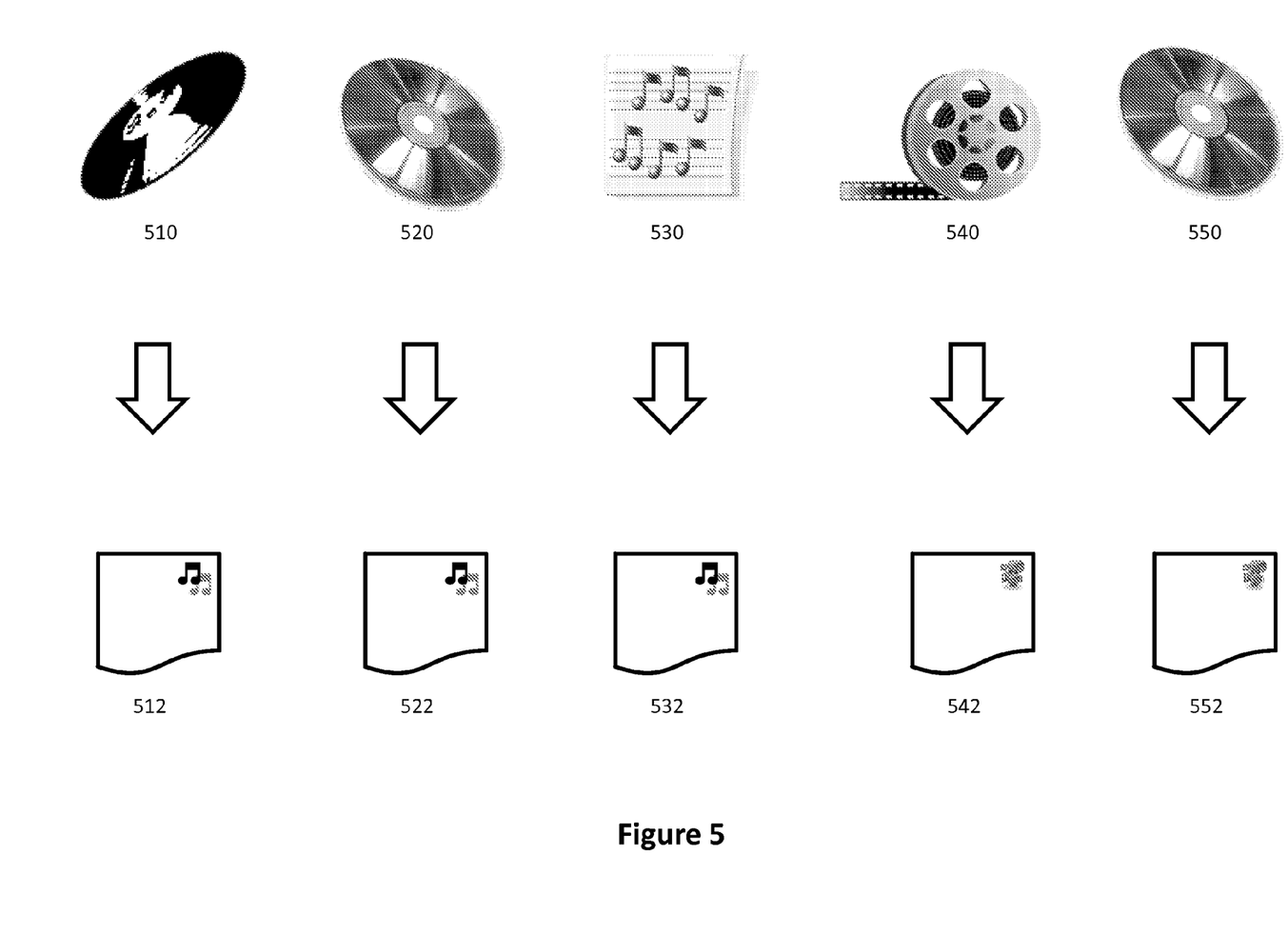
FIG. 5 shows exemplary three-dimensional representations that have a surface area is translated into a digital audio or video representation.

In FIG. 5, a plurality of 3D objects 510, 520, 530, 540, and 550 have audio or video components embedded in a language on its surface that could be translated into audio file 512, audio file 522, audio file 532, video file 542, and video file 552, respectively. Here, object 510 is shown as a record, object 520 is shown as a CD, object 530 is shown as a piece of sheet music, object 540 is shown as a movie reel, and object 550 is shown as a DVD. In each of these cases, the system preferably analyzes the 3D object to determine if the 3D object could be translated into a digital audio or a digital video file, virtually "plays" the 3D object to extract a digital file from the 3D object, and then pattern-matches the digital file against known digital audio files and digital video files in order to determine if the 3D object violates the protected subject matter merely when translated into a different digital format. Alternatively, the 3D object (a long play microgroove record) could also be translated into an analogue audio or analogue video file, and compare that analogue file against known analogue audio/video files in order to determine if the 3D object violates the protected subject matter.

It should be apparent to those skilled in the art that many more modifications besides those already described are possible without departing from the inventive concepts herein. The inventive subject matter, therefore, is not to be restricted except in the scope of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A method of analyzing a file containing instructions to print a three-dimensional object, comprising the steps of
    saving the file in a memory;
    executing instructions on a processor to virtually print a virtualized representation of the three-dimensional object within a virtualized Euclidian space using voxels to create the virtualized representation;
    constructing a virtualized first two-dimensional representation of the virtualized three-dimensional object;
    constructing a virtualized second two-dimensional representation of the virtualized three-dimensional object, wherein the first two-dimensional representation is different from the second two-dimensional representation;
    analyzing the first and second two-dimensional representations to detect a protected subject matter; and
    sending an alert when the protected subject matter is detected within at least one of the first two-dimensional representation and the second two-dimensional representation.

2. The method of claim 1, wherein the file is at least one of a CAD file, STL file, VRML file, OBJ file, 3DS file, MAX file, and PRJ file.

3. The method of claim 1, wherein constructing the virtualized first two-dimensional representation comprises creating an image of the virtualized three-dimensional object from a viewing angle of a first exterior surface of the virtualized three-dimensional object, and wherein constructing the virtualized second two-dimensional representation comprises creating an image of the virtualized three-dimensional object from a viewing angle of a second exterior surface of the virtualized three-dimensional object.

4. The method of claim 1, wherein constructing the virtualized first two-dimensional representation comprises constructing an unfolded representation of a curved surface of the virtualized three-dimensional object.

5. The method of claim 1, wherein constructing the virtualized first two-dimensional representation comprises merging a first flat surface of the virtualized three-dimensional object and a second flat surface of the virtualized three-dimensional object.

6. The method of claim 1, wherein the step of analyzing the first and second two-dimensional representations further comprise:
    determining whether at least one of the first and second two-dimensional representations could contain a visually unique component of the protected subject matter at an angle, wherein the visually unique component is detected upon a surface of the virtualized representation of the three-dimensional object; and
    rotating a view of the virtualized representation of the three-dimensional object to display the visually unique component from a viewing angle that optimizes a similarity between the view and the protected subject matter.

7. The method of claim 6, wherein the step of sending the alert comprises transmitting the optimized two-dimensional representation of the virtualized three-dimensional representation.

8. The method of claim 6, wherein the alert is sent with the rotated two-dimensional representation.

9. The method of claim 1, wherein the step of sending the alert comprises notifying an online service provider (OSP) of a potentially infringing act.

10. The method of claim 1, further comprising analyzing metadata embedded within the file when the protected subject matter is detected.

11. The method of claim 10, wherein the metadata comprises an identity of a distributor of the file.

12. The method of claim 10, wherein the alert is sent with at least a portion of the metadata.

13. The method of claim 1, wherein the protected subject matter is a copyrighted work.

14. The method of claim 1, wherein the protected subject matter is a word mark.

15. The method of claim 1, wherein the protected subject matter is a logo.

16. The method of claim 1, wherein the step of analyzing the first and second two-dimensional representations to detect a protected subject matter comprises creating a text file that contains alphanumeric text detected within at least one of the first two-dimensional representation and the second two-dimensional representation.

17. The method of claim 1, wherein the step of analyzing the first and second two-dimensional representations to detect a protected subject matter comprises determining a percentage likelihood of a similarity between at least one of the first and second two-dimensional representations and the protected subject matter, wherein the step of sending an alert is triggered when the percentage is above a threshold value.

18. The method of claim 1, wherein the step of analyzing the first and second two-dimensional representations to detect a protected subject matter comprises:
    determining a percentage likelihood of a similarity between at least one of the first and second two-dimensional representations and the protected subject matter; and flagging the three-dimensional object for secondary review when the percentage is higher than a first threshold and lower than a second threshold.

19. The method of claim 1, wherein the step of analyzing the first and second two-dimensional representations to detect a protected subject matter comprises detecting that a license term has been violated.

20. The method of claim 19, wherein the step of sending an alert comprises notifying an authority that a distributor of the file violated the license term.

* * * * *